(12) United States Patent
Chen

(10) Patent No.: US 8,047,649 B2
(45) Date of Patent: Nov. 1, 2011

(54) EYEGLASSES

(76) Inventor: Chih-Ming Chen, Tainan (TW)

( * ) Notice: Subject to any disclaimer, the term of this patent is extended or adjusted under 35 U.S.C. 154(b) by 164 days.

(21) Appl. No.: 12/687,249

(22) Filed: Jan. 14, 2010

(65) Prior Publication Data

US 2011/0170049 A1     Jul. 14, 2011

(51) Int. Cl.
*G02C 1/00* (2006.01)

(52) U.S. Cl. .......................................... 351/106; 351/86

(58) Field of Classification Search ..................... 351/86, 351/83, 106, 103, 92, 90, 41
See application file for complete search history.

(56) References Cited

U.S. PATENT DOCUMENTS

| | | | | |
|---|---|---|---|---|
| 5,467,148 A | * | 11/1995 | Conway | 351/85 |
| 6,848,786 B1 | * | 2/2005 | Teng | 351/83 |
| 7,399,078 B2 | * | 7/2008 | Sheldon | 351/57 |
| 7,922,320 B1 | * | 4/2011 | Tsai | 351/86 |

* cited by examiner

*Primary Examiner* — Hung Dang
(74) *Attorney, Agent, or Firm* — Alan Kamrath; Kamrath & Associates PA

(57) ABSTRACT

The invention relates to a pair of eyeglasses which include a lens stand and a pair of gaskets. Each gasket can be detachably connected to the lens stand. Each gasket has an inner edge that protrudes forwards to accommodate the lens. The degree of the curve of the lens is smaller than that of the lens stand relative to the horizontal direction, so that the size of the lens can be efficiently reduced, and hence the lens with diopter can be used easily and aberration can be efficiently eliminated. Furthermore, after the gaskets are connected to the lens stand, the upper portion of the gaskets may generate gas permeable holes so as to prevent the lens from fogging up.

6 Claims, 5 Drawing Sheets

EYEGLASSES

BACKGROUND OF THE INVENTION

1. Field of the Invention

The invention relates to a pair of eyeglasses, and more particularly, to a sport eyeglasses which is suitable for dioptric lenses, with an air permeability to prevent the lens from fogging up.

2. Description of the Prior Art

Someone usually wears a pair of sport eyeglasses, while taking exercise, like ball playing, riding or jogging. Considering the profile of the forehead of the person who wears the glasses, the lens stand of the sport glasses has a large backward curve. Specifically, such kind of glasses is always bent in an angle larger than 18°. The lenses of such kind of glasses can be detachably connected to the lens stand so that the lenses can be replaced for different applications. However, a common problem of the sport glasses is that aberration may be caused if the lenses disposed to the sport glasses are dioptric. That is to say, the dioptric lenses with the greater curve are easier to cause aberration. Furthermore, the size of the lenses of the sport glasses is larger than that of the general glasses, so the dioptric lenses to be fit on the sport glasses also need to have a larger size.

In addition, because the curvature of the sport glasses is similar with that of the face of the person wearing the sport glasses, the lenses will be fogged up due to the heat and sweat caused during the exercise. Therefore, the one wearing the glasses needs to clean the lenses during the exercise, and that is not convenient and is very dangerous.

SUMMARY OF THE INVENTION

An object of the invention is to provide a pair of eyeglasses which can be suitable for the dioptric lenses, eliminating aberration and reducing the size of the lenses.

Another purpose of the invention is to provide a pair of eyeglasses with a good air permeability, so as to prevent the lenses from fogging up. Accordingly, the one who wear the eyeglasses needs not to clean the lenses during the exercise.

According to an embodiment of the invention, the eyeglasses include a lens stand and two gaskets. The lens stand is curved relative to a first axial direction with a first curvature. The lens stand includes two portions along the first axial direction. Each portion includes an upper arm, an inner arm and an outer arm. The inner arm and the outer arm are extended downwards from two ends of the upper arm respectively, so that each portion has an inner edge substantially shaped like an inverse U. The inner edge of each portion has a trench. The gaskets are connected to the inner edges of the portions respectively. Each gasket includes a frame which has an outer edge and an inner edge protruding forwards. The outer edge of the gasket is correspondingly disposed in the trench of the inner edge of the portion. The inner edge of each gasket has a connection trench to connect the lens. The lens has a second curvature relative to the first axial direction. The second curvature is smaller than the first curvature. The included angle of the line (corresponding to the second curvature) and the first axial direction is between 5° and 18°.

In an embodiment of the invention, the curvature of the outer edge of the gasket relative to the first axial direction is substantially the same as the first curvature of the lens stand. Each portion further includes a front edge and a rear edge along a second axial direction perpendicular to the first axial direction. The trench of the portion is disposed between the rear edge and the rear edge. The outer edge of the upper arm of the portion has a dens-shaped object. The frame of the gasket is circular and has an upper portion and a lower portion along a third axial direction which is perpendicular to the first and second axial directions. The upper portion of the frame has at least one gap which is aimed at the dens-shaped object to form a gas permeable hole at the upper portion of the frame.

In an embodiment of the invention, the inner side and the outer side of the trench of the upper arm of each portion are concave to form a first indentation and a second indentation, respectively. The inner side and the outer side of the upper portion of the frame have a first protrusion and a second protrusion, respectively. After the gaskets are correspondingly disposed in the inner edges of the portions, the first and second protrusions are correspondingly inserted to and connected to the first and second indentations. The frame can further comprise an inner portion and an outer portion along the first axial direction. The outer portion protrudes forwards more than the inner portion.

In one embodiment, the upper portions, the inner portions and the outer portions of the frames are correspondingly inserted in and connected to the trenches of the upper arms, the inner arms and the outer arms of the portions.

Further benefits and advantages of the present invention will become apparent after a careful reading of the detailed description with appropriate reference to the accompanying drawings.

DETAILED DESCRIPTION OF THE INVENTION

Figure 1:
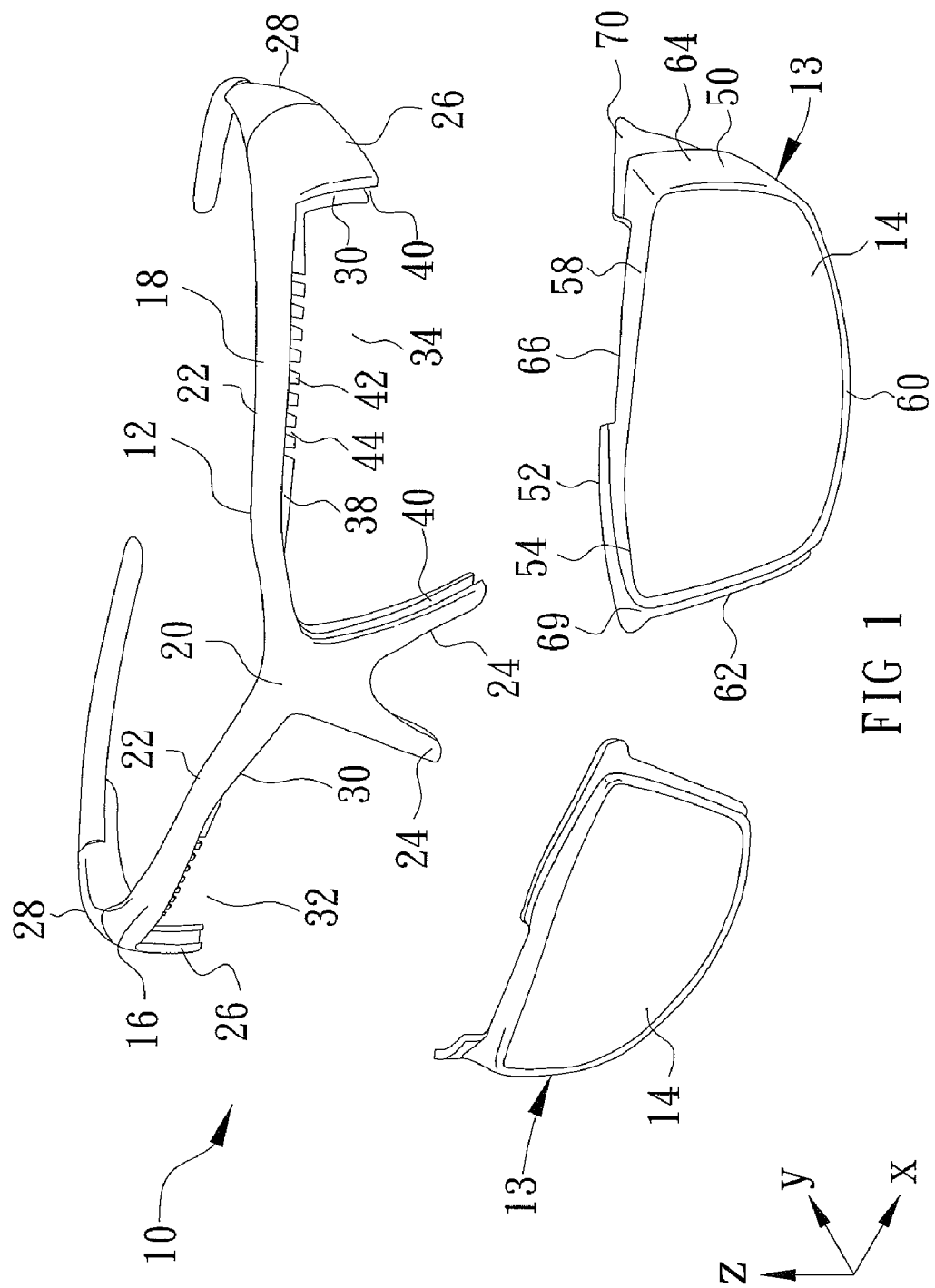
FIG. 1 is an exploded view of an eyeglasses according to a preferred embodiment of the invention.
Figure 2:
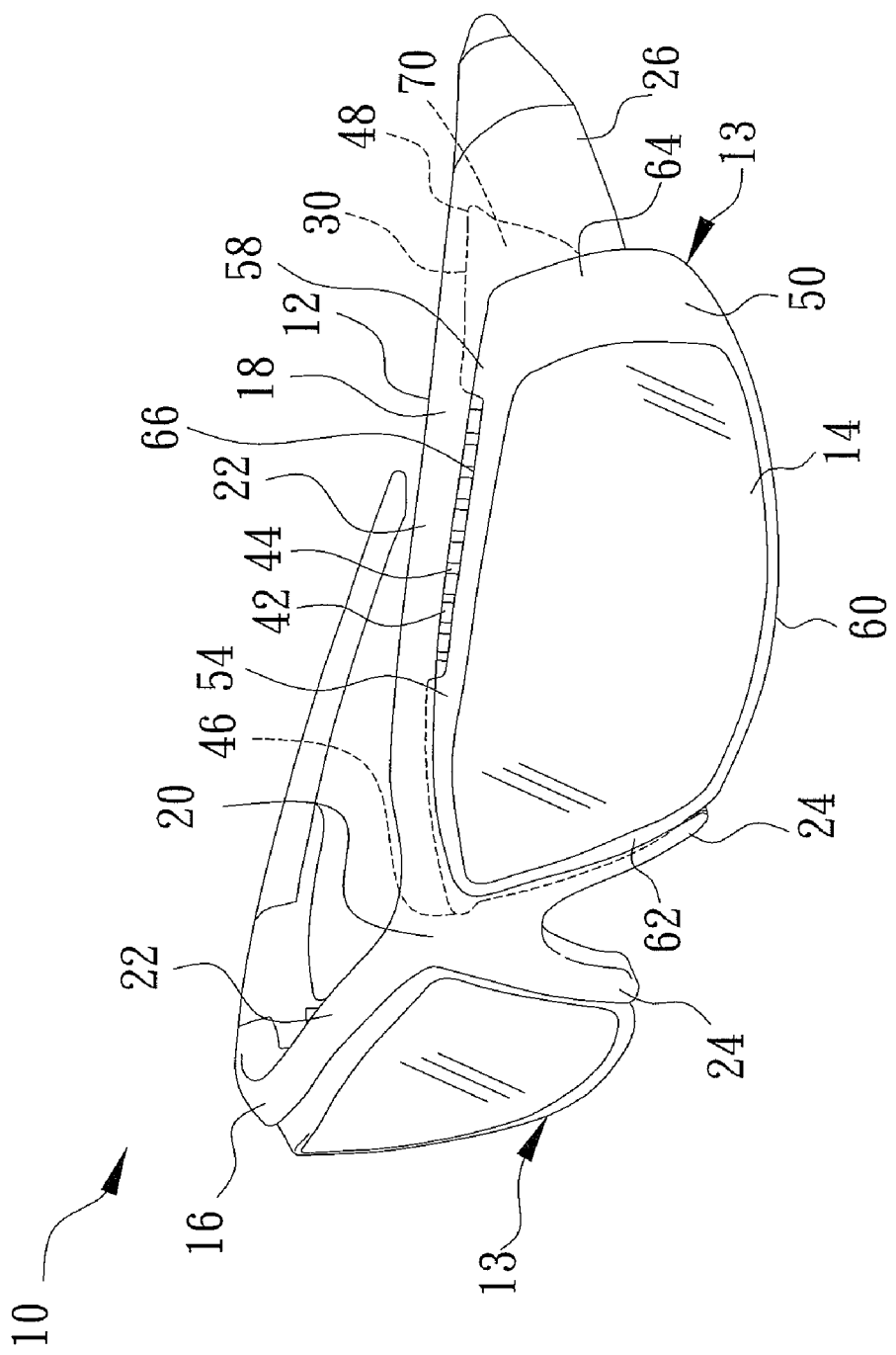
FIG. 2 is an assembly drawing according to FIG. 1.
Figure 3:
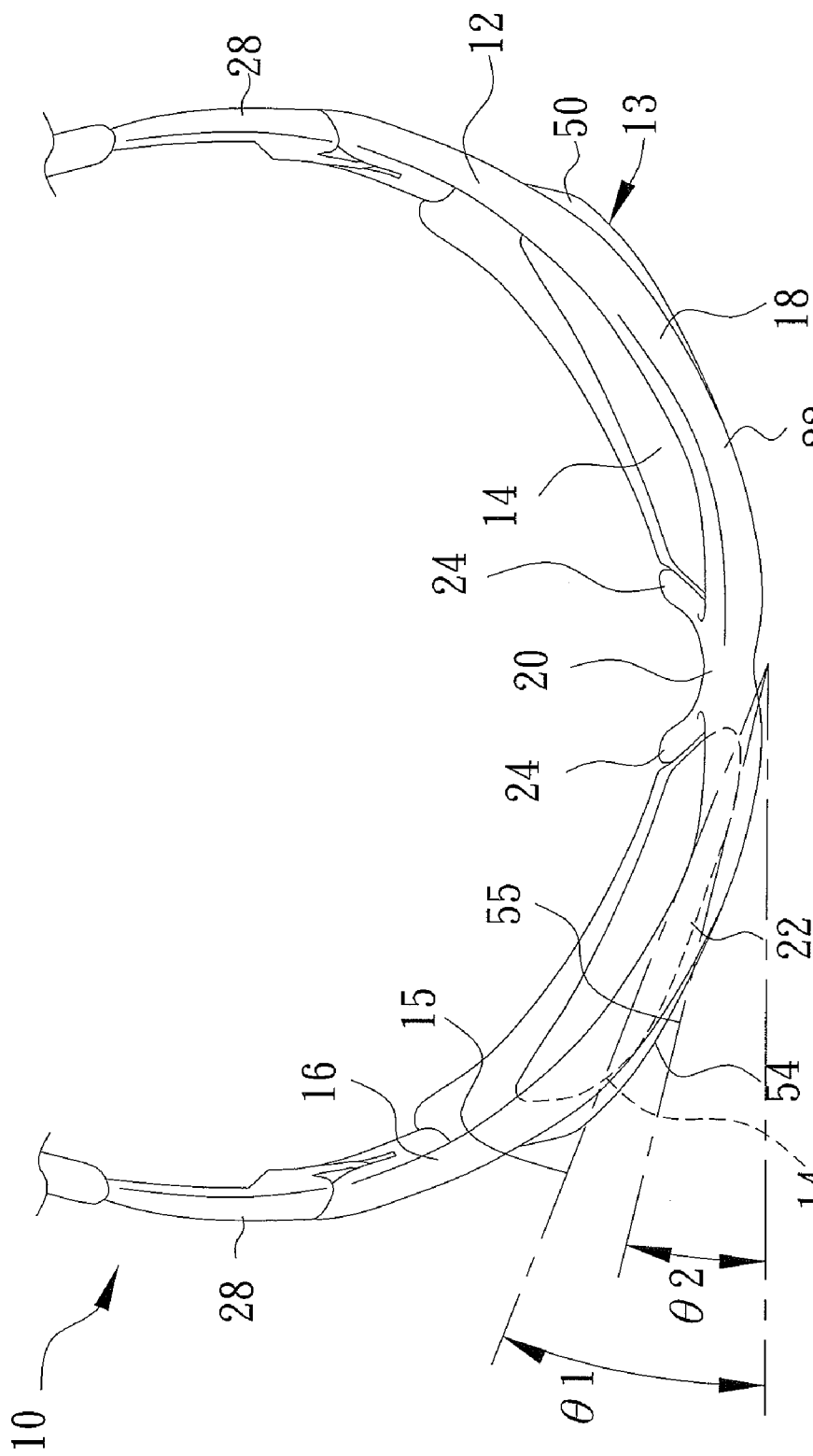
FIG. 3 is a top view of the eyeglasses shown in FIG. 2.
Figure 4:
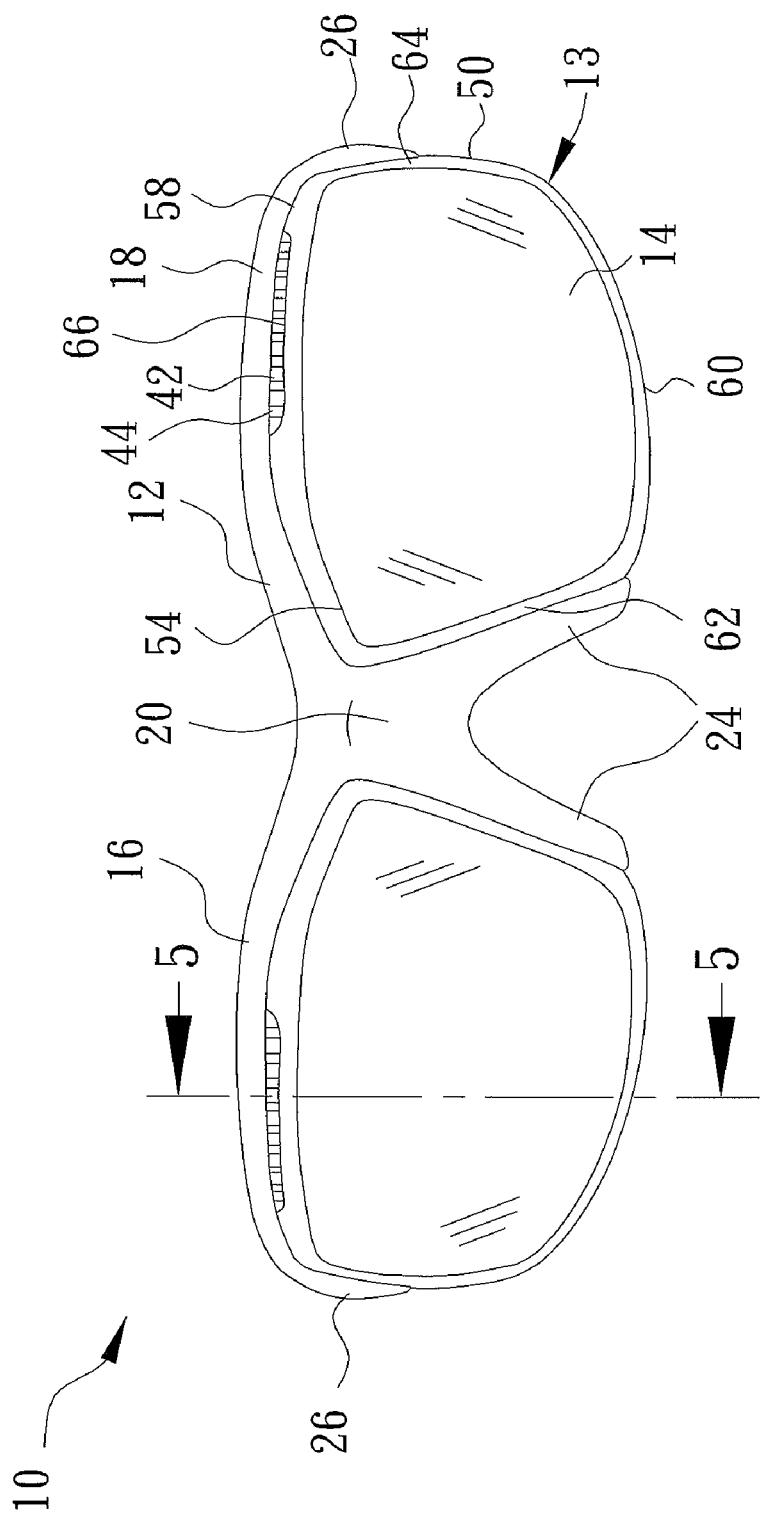
FIG. 4 is a front view of the eyeglasses shown in FIG. 3.

As shown in FIGS. 1 to 5, a pair of eyeglasses 10 according to a preferred embodiment of the invention includes a lens stand 12 and a pair of gaskets 13 which can be detachably connected to the lens stand 12. Two lenses 14 are disposed to the gaskets 13, respectively. In the embodiment, the lens stand 12 can be made of inflexible material, such as plastics, to provide structure strength. The lens stand 12 is bent backwards relative to a first axial direction (horizontal direction, the direction of X axis shown in FIG. 1) with a first curvature (corresponding to the line with number 15 shown in FIG. 3). The included angle θ1 which is corresponding to the first curvature is larger than 18°, so the eyeglasses 10 can be properly as a sport glasses. To be noted, the eyeglasses 10 can be applied not only to the sport glasses, but also to other kind of glasses.

Figure 5:
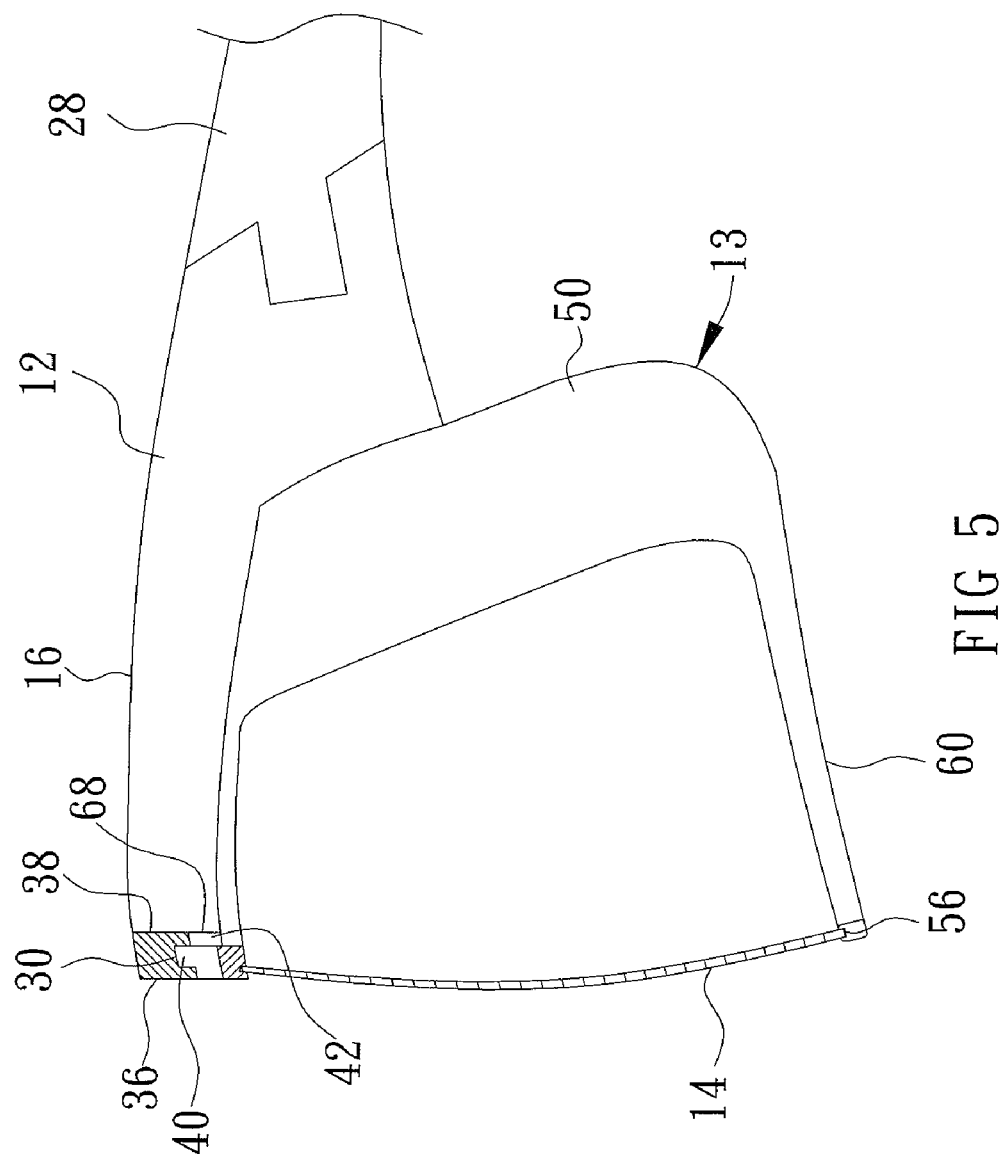
FIG. 5 is a sectional diagram taken along the section 5-5 in FIG. 4.

The lens stand 12 has a first portion 16 and a second portion 18 along the first axial direction. The first and second portions 16 and 18 are connected through a bridging portion 20. Each of the portions 16 and 18 has an upper arm 22, an inner arm 24 and an outer arm 26. The inner arm 24 and the outer arm 26 are extended downwards from two ends of the upper arm 22 (wherein the inner arm 24 is near the bridging portion 20, and the outer arm 26 is far from the bridging portion 20). The two inner arms 24 and the bridging portion 20 are connected together, shaped like an inverse V. The nasal pads (not shown schematically) can be disposed at the inner arms 24. The outer arm 26 of each portions 16 and 18 is connected to a hanger 28 through a hinge (not shown schematically). The hanger 28 can rotate relative to the lens stand 12 for folding. Besides, each of the portions 16 and 18 has an inner edge 30 shaped like an inverse U. The inner edges 30 of the first and second portions 16 and 18 have a first opening 32 and a second opening 34, respectively. The first and second openings 32 and 34 can accommodate the gaskets 13. Each of the portions 16 and 18 can further comprise a front edge 36 and a rear edge 38 (as shown in FIG. 5) along a second axial direction (the direction along the width of the lens stand, the direction of Y axis shown in FIG. 1) which is perpendicular to the first axial direction. The inner edge 30 of each portions 16 and 18 has a trench 40 which is disposed between the front edge 36 and the rear edge 38. Besides, the rear edge 38 of the upper arm 22 of each portion 16 and 18 has a dens-shaped object 42. The dens-shaped object 42 of the first portion 16 has plural breaches 44 connected to the first opening 32, and the dens-shaped object 42 of the second portion 18 has plural breaches 44 connected to the second opening 34. In the embodiment, the inner side and the outer side of the trench 40 of the upper arm 22 of each portion 16 and 18 are concave to form a first indentation 46 and a second indentation 48, respectively.

Each gasket 13 has a frame 50 which has an outer edge 52 and an inner edge 54. The inner edge 54 is extending forwards. The curvature of the outer edge 52 relative to the first axial direction is substantially the same as the first curvature (corresponding to the line with number 15 shown in FIG. 3) of the lens stand 12, so that the outer edges 52 of the gaskets 13 can be correspondingly disposed in the trenches 40 of the inner edges 30 of the portions 16 and 18. The inner edge 54 of each gasket 13 has a connection trench 56 to connect the outer edge of the lens 14. The lens can be with diopter or without diopter. Besides, the inner edge 54 of each gasket 13 has a smaller curvature relative to the first axial direction, so that the lens 14 can have a second curvature (corresponding to the line with number 55 shown in FIG. 3) smaller than the first curvature. In the embodiment, the included angle θ2 of the line 55 (corresponding to the second curvature) and the first axial direction is between 5° and 18°.

In the embodiment, the frame 50 is annular and has a upper portion 58 and a lower portion 60 along a third axial direction (the direction along the height of the lens stand, the direction of Z axis shown in FIG. 1) which is perpendicular to the first and second axial directions. The frame 50 can further comprise an inner portion 62 and an outer portion 64 along the first axial direction. In the embodiment, the outer portion 64 protrude forwards more than the inner portion 62, so that the lens 14 at the frame 50 can have the second curvature with a value 5°~18°. The upper portion 58, the inner portion 62 and the outer portion 64 of the frame 50 of each gasket 13 are inserted in and clasped to the trench 40 of the upper arm 22, the inner arm 24 and the outer arm 26 of the portion 16 and 18 of the lens stand 12, respectively. Besides, the inner side and the outer side of the upper portion 58 have a first protrusion 69 and a second protrusion 70, respectively. After the gaskets 13 are correspondingly disposed in the trenches 40 of the inner edges 30 of the portions 16 and 18, the first protrusions 69 and the second protrusions 70 are inserted in and connected to the first indentations 46 and the second indentations 48 of the portions 16 and 18 correspondingly. In addition, the upper portion 58 of the frame 50 has a gap 66. In the embodiment, the gap 66 is disposed at the outer edge 52 of the gasket 13 and aimed at the dens-shaped object 42 of the upper arm 22 of the portion 16 and 18. Accordingly, after the gaskets 13 are disposed in the inner edges 30 of the portions 16 and 18, the upper portion 58 of each frame 50 has a gas permeable hole 68.

For the assembly of the eyeglasses 10, the second protrusion 70 of the gasket 13 is first inserted in the second indentation 48 of the corresponding portion, and then the first protrusion 69 of the gasket 13 is pressed in the first indentation 46 of the corresponding portion, so that the gasket 13 connects to the lens stand 12. Furthermore, the gasket 13 can be separated from the lens stand 12 through the reverse operation for the replacement of the gasket 13 or the lens 14.

In the embodiment, the inner edge 54 of the gasket 13 is extended forwards, so the lens 14 in the gasket 13 can form an angle between 5° and 18° relative to the horizontal direction. Accordingly, the size of the lens 14 can be reduced properly (the distance of two edges of the lens 14 may be between 50 mm and 59 mm, for example). Furthermore, the gaskets 13 can easily cooperate with the lens having diopter. Besides, due to the reduced degree of curve of the lens 14, the aberration can efficiently be eliminated with the dioptric lens 14. In addition, the gasket 13 is connected to the lens stand 12 to form the gas permeable hole 68 at the upper portion of the gasket 13. The gas permeable hole 68 can prevent the lens 14 from fogging up.

The features of the invention may be modified. For example, the frame 50 of the gasket 13 is not limited to be annular. The dens-shaped object 42 can be disposed at the front edge 36 of the upper arm 22 of the portion 16 and 18.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An eyeglasses, comprising:
a lens stand, curved relative to a first axial direction with a first curvature, and having two portions along the first axial direction, wherein each portion has an upper arm, an inner arm and an outer arm, the inner arm and the outer arm are extending downwards from two ends of the upper arm respectively so that each portion has an inner edge substantially shaped like inverse-U, and the inner edge of each portion has a trench; and
two gaskets, each connected to the inner edge of the corresponding portion, and having a frame which has an outer edge and an inner edge protruding forwards, wherein the outer edges of the gaskets are correspondingly disposed in the trenches of the inner edges of the portions, the inner edge of each gasket has a connection trench to connect a lens which has a second curvature relative to the first axial direction, the second curvature is smaller than the first curvature, and the included angle of the line corresponding to the second curvature and the first axial direction is between 5° and 18°.

2. The eyeglasses as recited in claim 1, wherein
the curvature of the outer edge of each gasket relative to the first axial direction is substantially the same as the first curvature of the lens stand;
each portion further has a front edge and a rear edge along a second axial direction perpendicular to the first axial direction, the trench of each portion is disposed between the front edge and the rear edge, and a dens-shaped object is disposed at the rear edge of the upper are of each portion; and
each gasket includes an upper portion and a lower portion along a third axial direction perpendicular to the first and second axial directions, and the upper portion of the gasket has a gap aimed at the dens-shaped object of the upper arm of the portion so that the upper portion of each frame has a gas permeable hole.

3. The eyeglasses as recited in claim 2, wherein
the inner side and outer side of the trench of the upper arm of each portion are concave to form a first indentation and a second indentation, respectively; and
the inner side and the outer side of the upper portion of the frame have a first protrusion and a second protrusion respectively, and after the gaskets are correspondingly disposed in the inner edges of the portions, the first protrusions and the second protrusions are correspondingly inserted in and connected to the first indentations and the second indentations.

4. The eyeglasses as recited in claim 3, wherein
the inner edges of the portions have respectively two openings which accommodate the gaskets, and the denss-shaped object of each portion has plural breaches connected to the corresponding opening; and
the gap of the upper portion of the frame is disposed at the outer edge of the frame.

5. The eyeglasses as recited in claim 4, wherein
the portions are connected through a bridging portion, the inner arms of the portions and the bridging portion are connected together, shaped like an inverse V, and nasal pads are connected to the inner arms; and
the outer arm of each portion is hinged with a hanger through a hinge.

6. The eyeglasses as recited in claim 5, wherein
the frame of each gasket is annular, the frame further includes an inner portion and an outer portion along the first axial direction, and the outer portion protrudes forwards more than the inner portion; and
the upper portions, the inner portions and the outer portions of the frames of the gaskets are correspondingly inserted in and connected to the trenches of the upper arms, the inner arms and the outer arms of the portions.

* * * * *